US006581096B1

United States Patent
Cottrille et al.

(10) Patent No.: US 6,581,096 B1
(45) Date of Patent: Jun. 17, 2003

(54) SCALABLE COMPUTING SYSTEM FOR MANAGING DYNAMIC COMMUNITIES IN MULTIPLE TIER COMPUTING SYSTEM

(75) Inventors: Scott C. Cottrille, Redmond, WA (US); Yoram Yaacovi, Redmond, WA (US); Antony Halim, Bellevue, WA (US); Alok K. Sinha, Redmond, WA (US); Marco A. DeMello, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/339,635

(22) Filed: Jun. 24, 1999

(51) Int. Cl.[7] .................... G06F 15/173; G06F 15/16
(52) U.S. Cl. ........................... 709/223; 709/219
(58) Field of Search ............................ 709/203, 205, 709/219, 223

(56) References Cited

U.S. PATENT DOCUMENTS

| 5,796,393 | A | * | 8/1998 | MacNaughton et al. .... 345/733 |
| 5,806,065 | A | * | 9/1998 | Lomet ............................ 707/3 |
| 5,958,008 | A | * | 9/1999 | Pogrebisky et al. ........ 709/223 |
| 6,076,100 | A | * | 6/2000 | Cottrille et al. ............. 709/203 |
| 6,081,830 | A | * | 6/2000 | Schindler .................... 345/721 |
| 6,199,113 | B1 | * | 3/2001 | Alegre et al. ............... 709/219 |
| 6,212,548 | B1 | * | 4/2001 | DeSimone et al. ......... 709/204 |
| 6,226,744 | B1 | * | 5/2001 | Murphy et al. ............. 713/200 |
| 6,286,104 | B1 | * | 9/2001 | Buhle et al. .................. 707/10 |

OTHER PUBLICATIONS

"For Starters: #10. We are Fam–i–ly: Extending Your Web Site's Reach", *Site Builder Magazine (now known as MSDN Online Voices)*, http://msdn.microsoft.com.workshop/essentials/forstarters/starts1223.asp (5 pages).

"Pan–Browser Support for Annotations and Other Meta–Information on the World Wide Web", *Fifth International World Wide Web Conference, Paris, France*, http://www5conf.inria.fr/fich_html/papers/P15/Overview.html (17 pages), (May 6–10, 1996).

* cited by examiner

Primary Examiner—Krisna Lim
(74) Attorney, Agent, or Firm—Christensen O'Connor Johnson Kindness (57) ABSTRACT

A scalable computing system for managing dynamic communities stores and provides access to community and member information. A community is a dynamic and virtual association of users. Some example features of a community include: a home page, membership, non-real time based messaging (threaded messages), chats, community calendar, annotations, and management tools for access control. The scalable architecture of the computing system for managing dynamic communities provides a computing system capable of handling the increasing number of community members and the community elements associated with the community.

19 Claims, 5 Drawing Sheets

SCALABLE COMPUTING SYSTEM FOR MANAGING DYNAMIC COMMUNITIES IN MULTIPLE TIER COMPUTING SYSTEM

CROSS REFERENCES

This application is related to co-filed and co-assigned U.S. patent application Ser. No. 09/339,733, filed on Jun. 24, 1999, entitled "Scalable Computing System for Managing Annotations". This application is also related to co-filed and co-assigned U.S. patent application Ser. No. 09/339,703, filed Jun. 24, 1999, entitled "Associating Annotations With a Content Source".

FIELD OF THE INVENTION

This invention relates generally to information systems and more particularly to a computing system having a scalable architecture that is capable of managing dynamic communities.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 1998, 1999 Microsoft Corporation. All Rights Reserved.

BACKGROUND OF THE INVENTION

The Internet is a worldwide collection of networks that span over 100 countries and connect millions of computers. As of 1998, the Internet had more than 100 million users worldwide and that number continues to grow rapidly. The Internet has quickly become a vital means of communication, collaboration, news, learning, commerce and entertainment.

The quickness and easy access to communication technology available to the growing number of Internet users is fostering the growth of online communities. A community is a virtual association of users. A community can comprise as little as a few users or as many as thousands of users or more. Communities commonly form around areas of similar interest. For example, communities form around topics such as sports, hobbies, pets, and technology to name a few. Common examples of the communication technology used to support communities include electronic newsletters, discussion-group mailing lists, news groups and chat rooms.

As the number of Internet users grows, the need for a scalable system to manage dynamic communities grows. Also, as profiles of Internet users become more diverse, the desire of Internet users to customize community features grows. For these and other reasons, there is a need for a scalable computing system for managing dynamic communities.

SUMMARY OF THE INVENTION

A scalable computing system for managing dynamic communities stores and provides access to community and member information. A community is a dynamic and virtual association of users. The scalable architecture of the computing system for managing dynamic communities provides a computing system capable of handling the increasing number of community members and the community elements associated with the community.

Example elements of a community include: a home page, membership, non-real time based messaging (threaded messages), chats, community calendar, annotations, and management tools for access control and the like. The computing system performs authentication of community members and access control to community information. The computing system also performs community management functions including adding, deleting, and modifying community properties. The computing system also controls user navigation and participation including browsing, reading and writing of content by users. The computing system for managing dynamic communities stores community elements and dynamically generates a page containing the requested community elements when a request for such is received.

In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system level overview of the invention is presented. In the third section, an example embodiment of a computing system for managing dynamic communities and for managing annotations is described. In the fourth section, example client action scenarios are described for a computing system that manages both dynamic communities and annotations.

Hardware and Operating Environment

Figure 1:
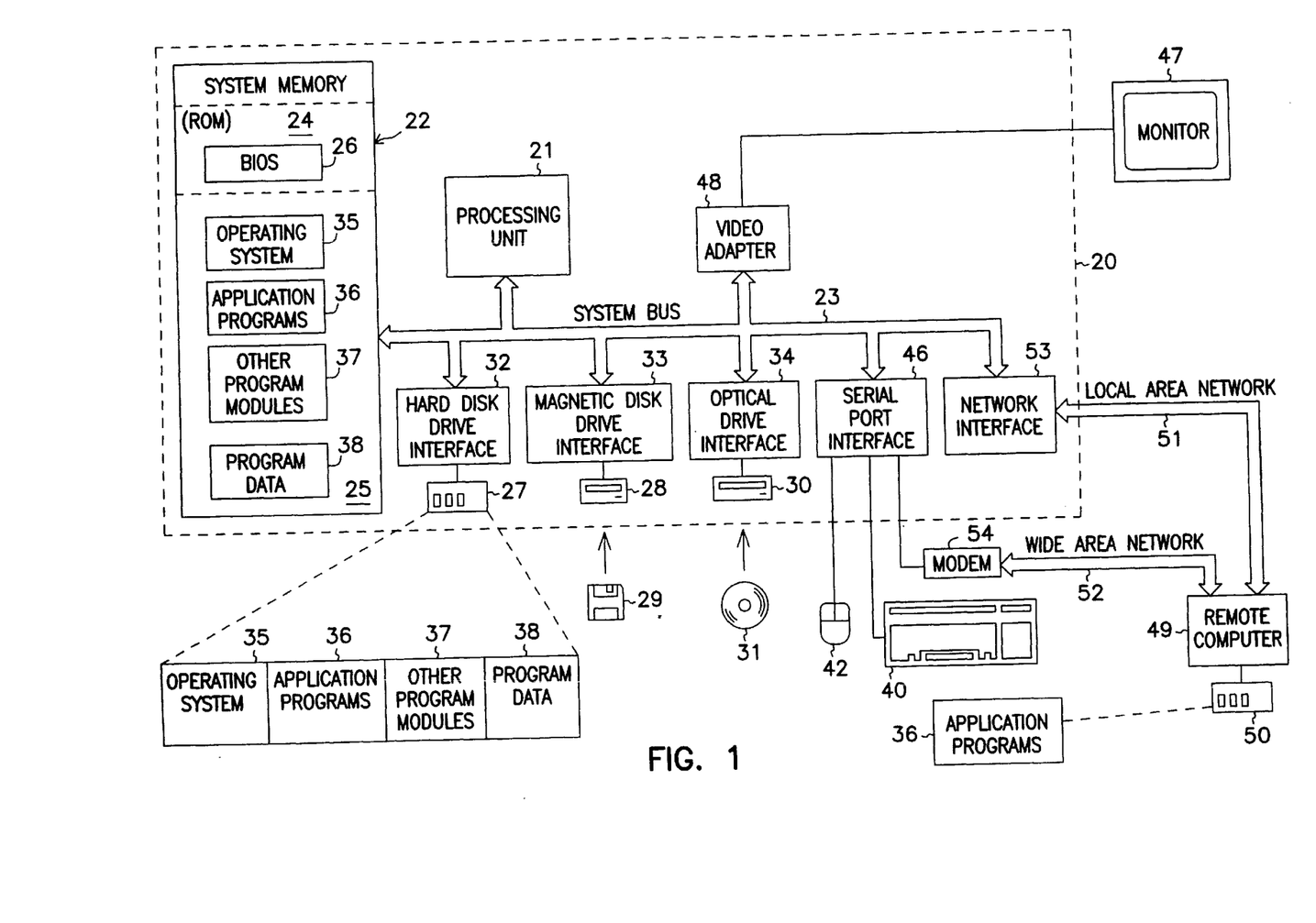
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices The exemplary hardware and operating environment of FIG. 1 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. a basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

Figure 2:
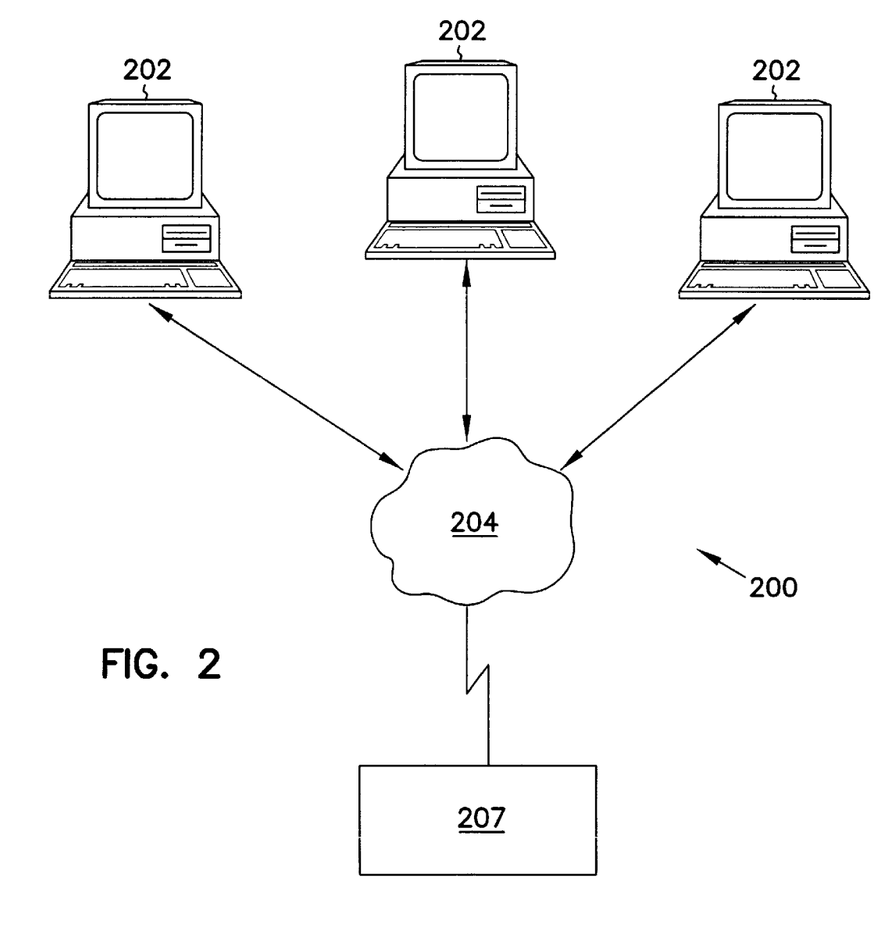
FIG. 2 is a diagram illustrating a system-level overview of an exemplary embodiment of the invention.

FIG. 2 is a diagram illustrating a computing environment 200 in which a scalable computing system manages dynamic communities. The computing environment 200 comprises one or more clients 202, a network 204 and a computing system 207. Each one of the clients 202 is coupled to the computing system 207 through the network 204. The computing system 207 manages elements of dynamic communities. The term "community" as used herein refers to a dynamic and virtual association of users. A community has several elements including but not limited to a home page for the community, real-time messages, non-real time based messaging (threaded messages), chats, a notification service, a message board, a community calendar, annotations, membership, access control and the like.

Figure 3:
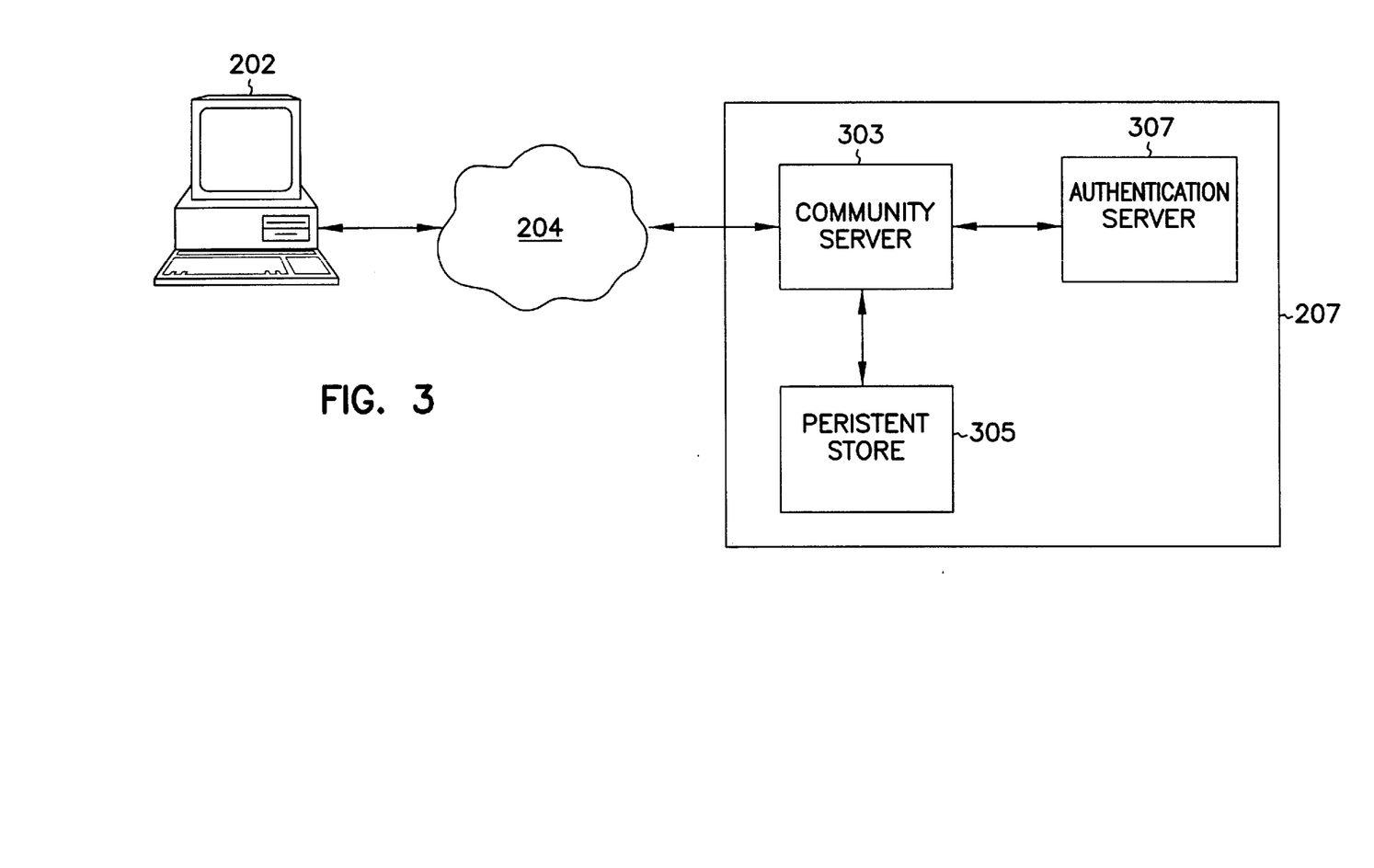
FIG. 3 is a diagram illustrating the components of one embodiment of a computing system for managing dynamic communities.

FIG. 3 is a diagram illustrating the components of one embodiment of the computing system 207 for managing dynamic communities. FIG. 3 comprises a client 202, a network 204 and a computing system 207. In the embodiment shown in FIG. 3, the computing system 207 comprises a community server 303, an authentication server 307 and one or more persistent data stores 305.

The client 202 is a computer running any software capable of displaying community elements. The client 202 interacts directly with the community server 303 of the computing system 207.

The computing system 207 comprises one or more servers for managing community elements and member information. One role of the computing system 207 is to provides access to community and member information. The community server 303 performs authentication of community members and access control to community information. In one embodiment, the community server 303 uses an authentication server 307 to verify the identity of a user. The authentication server 307 uses a user name and a password, for example, to verify the identity of the user. The community server 303 uses commonly available authorization mechanisms to control access to community elements. The community server 303 allows the user to access various community elements based on the user's identity.

Another role of the computing system 207 is to perform community management functions including adding, deleting, and modifying community properties. Still another role of the computing system 207 is to control user navigation and participation in communities including browsing, reading and writing of content by users.

A novel feature of the computing system 207 is the scalable architecture for managing dynamic communities. The growing number of Internet users and the increasing participation in virtual communities increases the burden on a computing system hosting the community. The scalable architecture for managing dynamic communities of the present invention provides a computing system capable of handling the increasing number of community members and the community elements associated with the community. The computing system 207 is easily scaled to handle more requests for community information by adding additional community servers 303. The computing system 207 is easily scaled to store more community elements by adding additional persistent data stores 305. The scalability of the computing system is due to the fact that the community server 303 does not store all of the community elements. Rather, the community server 303 indexes the community elements and stores a reference to a persistent data store 305 containing the actual content of the community element.

An additional novel feature of the computing system 207 is that the computing system 207 does not store HTML pages with predetermined community elements. Instead, the computing system 207 stores content (i.e. the community elements) and dynamically creates an HTML page containing the requested content when a request from client 202 is received. When the community server 303 receives a request from the client 202 for access to one or more of the community elements, the community server assembles the community elements as a function of the request. The community server 303 returns the assembled elements to the client 202 for display.

For example, the community server 303 dynamically creates a home page for the community when a request from a member of the community to view the community home page is received. The community server 303 stores links, pointers, or other common references to the actual content for the home page. In one embodiment, the actual content is stored in one or more persistent data stores 305. Upon receiving a request from a community member for the home page, the community server 303 assembles the content for the home page and returns a dynamically created web page for display on the community member's browser. In this example embodiment, the community server 303 is accessed from a Web browser client. The community server 303 communicates with the Web browser using HTTP.

An example embodiment of a scalable computing system to manage dynamic communities has been described. The computing system for managing dynamic communities is scalable to handle large volumes of community elements and members.

Example Embodiments

Figure 4:
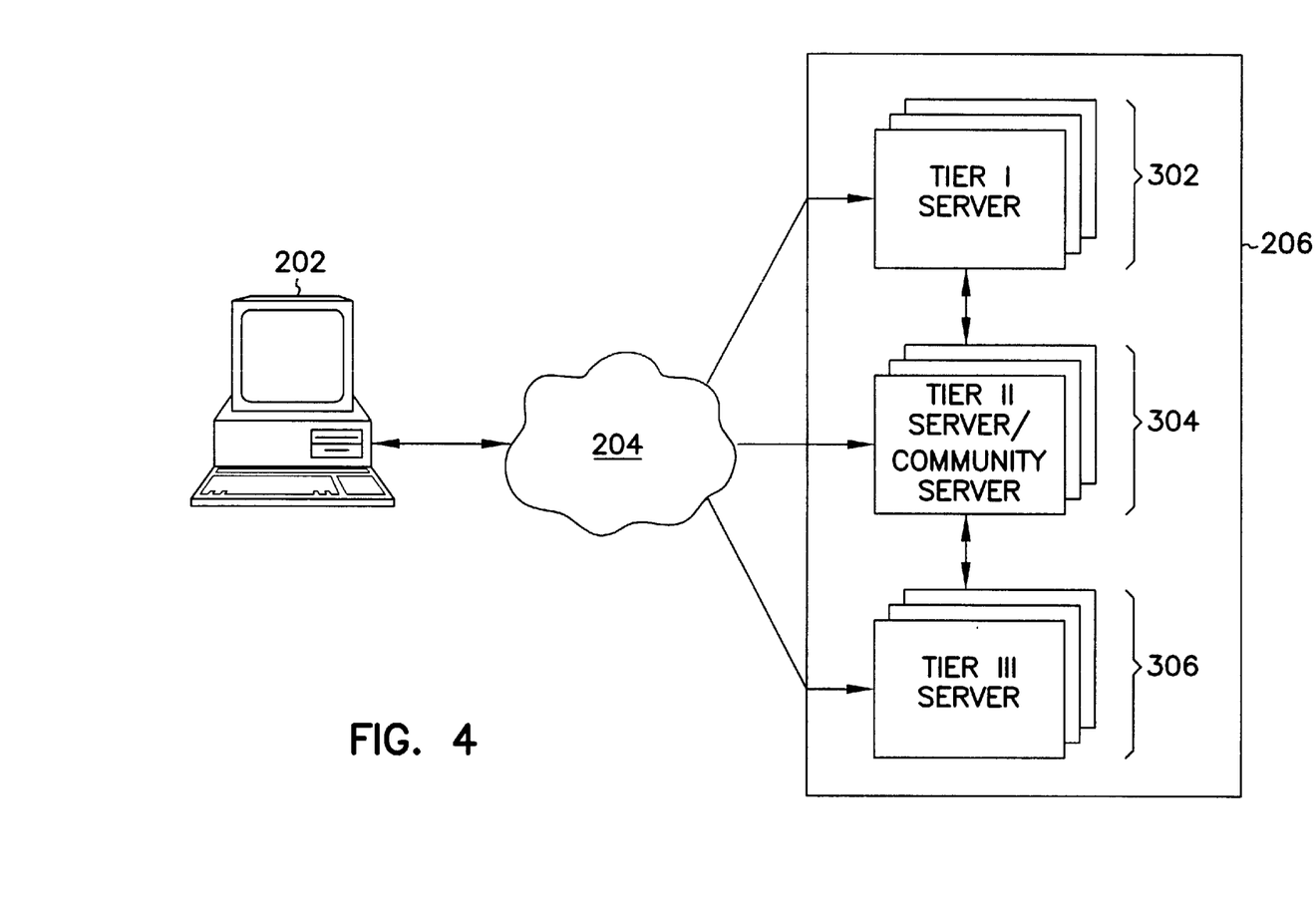
FIG. 4 is a diagram illustrating the components of one embodiment of a computing system for managing dynamic communities and for managing annotations.

In one embodiment of the invention, the computing system 207 of FIG. 3 is implemented in conjunction with a multiple tier computing system for managing annotations. FIG. 4 is a diagram illustrating the components of one embodiment of a computing system 206 for managing annotations and dynamic communities.

The term "annotation" as used herein refers to any content associated with a document space. In one embodiment the content is a text file, a threaded message, an audio file, a video file, a calendar file or other scheduling information, a chat room and the like. The document space is any document identified with a document identifier (also referred to herein as a "context document identifier"). In one embodiment, the document space is a file identified by a file name, a directory path or a uniform resource locator (URL) and the like. The document space provides the context for the annotation. An annotation is implemented as an object with properties. Properties for an example embodiment of an annotation include both generic properties that are common to all annotations and type-specific properties that are unique to a particular type of annotation FIG. 4 comprises a client 202, a network 204 and a computing system 206. In the embodiment shown in FIG. 4, the computing system 206 comprises three tiers of servers. The client 202 is a computer running any software capable of displaying community elements and annotations. To view annotations the client 202 interacts directly with a first tier, a combined second tier/community server, and a third tier of the computing system 206. In contrast, to view community elements the client 202 interacts directly with the combined second tier/community server.

The first tier of computing system 206 comprises one or more servers collectively referred to herein as a "tier I server" 302. A client 202 identifies a content source to the tier I server 302 using a document identifier. An example document identifier is a URL (Uniform Resource Locator) which provides an address for documents on the World Wide Web. The tier I server 302 indicates to the client 202 whether there are annotations associated with a current content source. In one embodiment, the tier I server 302 also indicates which communities own or have rights to the annotations associated with the current content source.

The tier I server 302 handles a large number of requests per second from clients, such as the client 202, and as a result must respond to the requests as fast as possible. If the tier I server 302 determines that there are no associations for the document identifier then the client request is answered with a response of "no associations" or the like. Therefore, one role of the tier I server 302 is to quickly respond to the client 202 when there are no associations and thus prevent further queries to the tier II server 304 and the tier III server 306 of computing system 206. Another role of the tier I server 302 is to quickly respond to the client 202 when annotations are associated with a document. In this role the tier I server 302 responds to the client with information that allows the client to retrieve an index of annotations associated with the document from the tier II server 304. In one embodiment, when there are associations for a document identifier, another role of the tier I server 302 is to indicate which communities own these annotations and to provide the client 202 with a URL for the combined tier II/community server 304 having more information about the communities.

As described above, the tier I server 302 is optimized to support fast response times by quickly responding to the client requests when there are no associations and thus preventing further queries to the computing system 206. The tier I server 302 also supports fast response times when annotations are associated with a content source by returning the communities associated with the annotation and information that allows the client 202 to retrieve an index of annotations from the combined tier II/community server rather than returning the content of all the annotations associated with the document.

The second tier of computing system 206 comprises one or more servers collectively referred to herein as a "tier II server" 304. The tier II server 304 contains indices for the content of all annotations. Annotations can be sorted and indexed in any manner that makes them more usable to a user. In one example embodiment, the annotations are indexed by community. For a client 202 requesting annotation information, the client is directed to the tier II server 304 by the tier I server 302. The index maintained by the tier II server 304 is used to refer the client 202 to the tier III server 306 storing the actual annotation content.

The tier II server 304 also functions as a community server, as described by reference to the computing system 207 of FIG. 3. The tier II server 304 is also referred to in FIG. 4 as a "combined tier II server/community server" 304. In this role, the tier II server 304 contains community and member information in addition to the annotation indices. As a community server, the tier II server 304 functions as a persistent store for community and member information, processes community and member queries from the client 202, and authenticates users. When the combined tier II server/community server 304 receives a request from the client 202 for access to one or more of the community elements, the combined tier II/community server 304 assembles the requested community elements stored on the combined tier II server/community server 304. The combined tier II/community server 304 returns the assembled elements to the client 202 for display. If the client 202 requesting community information is already aware of the URL of the tier II server 304 storing the community information, the client does not need to contact the tier I server 302 first to get a reference to the tier II server 304. Rather, the client just contacts the tier II server 304 storing the community information.

The third tier of computing system 206 comprises one or more servers collectively referred to herein as a "tier III server" 306. One function of the tier III server 306 is to store actual annotation content. Another function of the tier III server 306 is to accept new annotation posts from the client 202 and to begin the process of posting the annotation data to all three tiers of the computing system 206 accordingly. For a request for the body of an annotation, the client 202 is directed to the tier III server 306 by the tier II server 304. The client 202 communicates directly with the tier III server 306 to request the annotation. The tier III server 306 interacts also directly with the tier II server 304 and the client 202 during the process of posting annotations.

An example embodiment of a scalable computing system that manages annotations and dynamic communities has been described in this section of the detailed description.

Example Client Action Scenarios

Figure 5:
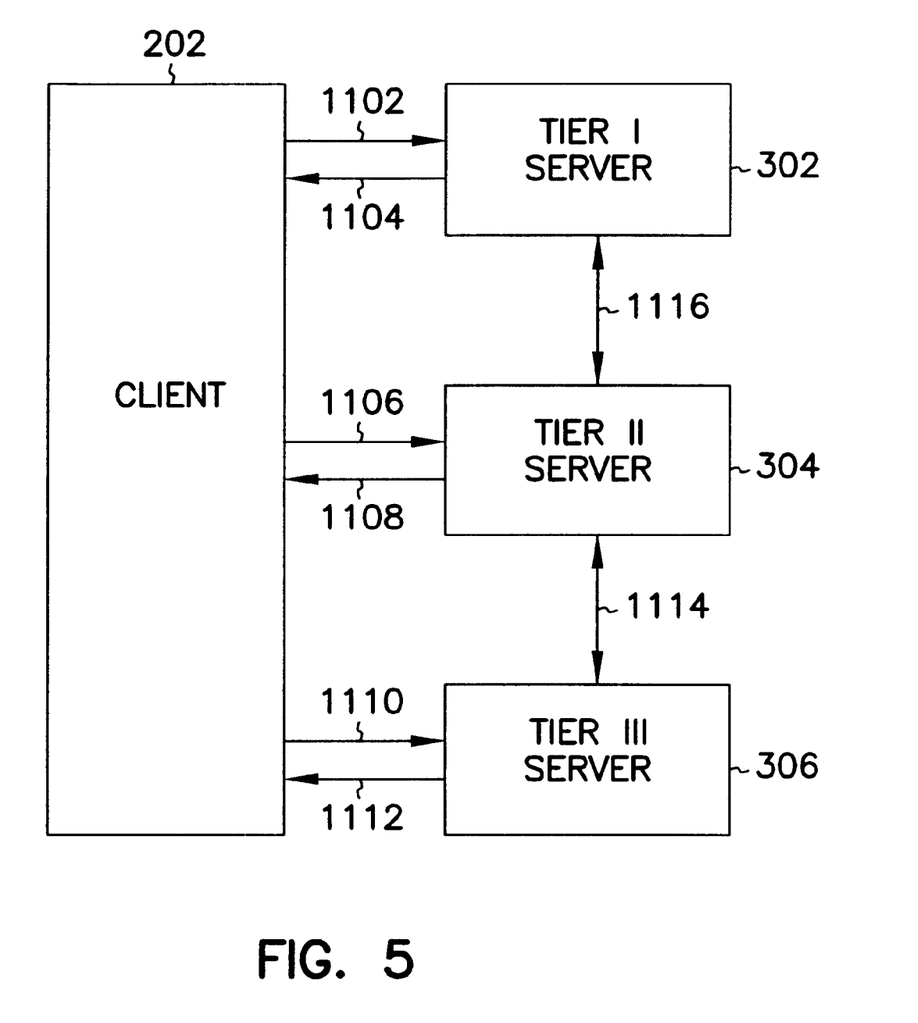
FIG. 5 is a block diagram illustrating the interaction between the client and the servers of computing system of FIG. 4.

FIG. 5 is a block diagram illustrating the interaction between the client and the servers of a scalable architecture according to one embodiment of the present invention for several example actions. In the example embodiment illustrated by the scenarios, the tier II server maintains indices for the actual annotation content stored on the tier III server. The tier II server also stores community and member information.

According to a first example action, the client 202 interacts directly with the tier I server 302 to identify communities that annotated a content source. To perform this action, the client 202 sends a request (line 1102) to the tier I server 302 to determine which communities annotated the content source. The tier I server 302 responds (line 1104) to the client 202 with a list of communities that annotated the content source arid a list of URLs to tier II servers 304 containing additional information for the communities. Prior to returning the list of communities to the client 202, the tier I server 302 determines whether or not the client has rights to receive all or a portion of the community information.

According to a second example action, the client 202 interacts directly with the tier II server 304 to get a list of annotation types associated with a content source for a specified community. To perform this action, the client 202 sends a request (line 1106) to the tier II server 304 to determine what annotation types exist for a particular content source and a particular community. The tier II server 304 verifies the client's right to view the annotation types for the specified community. The tier II server 304 responds (line 1108) with a list of types of annotations. In one embodiment, the tier II server 304 also responds (line 1108) with a number indicating the number of each type of annotation associated with the content source for the specified community.

According to a third example action, the client 202 interacts with the tier II server 304 to get a list of annotation headers associated with a content source for a particular community. To perform this action, the client 202 sends a request (line 1106) to the tier II server 304 for a list of annotation headers for a particular content source and a particular community. The tier II server 304 verifies the client's right to view the annotation headers for the particular community. The tier II server 304 responds (line 1108) with a list of annotation headers associated with the content source for the particular community. In one embodiment, the annotation headers include generic annotation properties such as type, author name, subject, and creation time and the like.

According to a fourth example action, the client 202 interacts directly with the tier II server 304 to create a new community. To perform this action, the client 202 sends a request (line 1106) to the tier II server 304 to create a community. The tier II server 304 responds (line 1108) with a success or failure result for the create action and with a community identifier or URL.

According to a fifth example action, the client 202 interacts directly with the tier II server 304 to join or leave a community. To perform this action, the client 202 sends a request (line 1106) to the tier II server 304 to join or leave a community. The tier II server 304 responds (line 1108) with a success or failure result for the action.

According to a sixth example action, the client 202 interacts directly with the tier II server to get desired community elements. To perform this action, the client 202 sends a request (line 1106) to the tier II server 306 for particular community elements. The tier II server 306 assembles the community elements requested. The tier II server dynamically generates a web page and responds (line 1108) to the client 202 with the requested community elements.

Conclusion

A scalable computing system for managing dynamic communities stores and provides access to community and member information. A community is a dynamic and virtual association of users. Example features of a community include: a home page, membership, non-real time based messaging (threaded messages), chats, community calendar, annotations, and management tools for access control.

The computing system for managing dynamic communities performs authentication of community members and access control to community information. The computing system for managing dynamic communities performs community management functions including adding, deleting, and modifying community properties. The computing system for managing dynamic communities also controls user navigation and participation including browsing, reading and writing of content by users. In one version of the invention, the computing system for managing dynamic communities is implemented in conjunction with a scalable computing system for managing annotations.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A multiple tier computer system for scalably managing dynamic communities, the multiple tier computing system comprising:
   a plurality of community elements;
   a server for storing indices of the plurality of community elements at a first tier; and one or more persistent data stores for storing the plurality of community elements at a second tier, wherein response to a request to access one or more of the community elements the server assembles the community elements and dynamically generates one or more pages; and
   wherein complex queries of said community elements are reduced to improve scalability by querying said indices to access said community elements.

2. The multiple tier computing system of claim 1, wherein the multiple tier computing system further comprises an authentication server to verify the identity of a user.

3. The multiple tier computing system of claim 1, wherein the community elements are selected from the group consisting of: a home page, a membership management tool, a message board, a notification service, non-real timed messages, real-time messages, a chat, a community calendar, a file library, and a picture album.

4. A scalable computerized method of managing dynamic communities, the method comprising:
   storing a plurality of community elements within a multiple tier computing system;
   receiving a request from a client to access one or more the community elements at a first tier;
   assembling the community elements as a function of the request from a second tier;
   dynamically generating one or more pages of the assembled elements for display by the client; and
   wherein to improve scalability said one ore more pages are generated with a reduced number of complex queries for said community elements.

5. The computerized method of claim 4, further comprising authenticating the user requesting the information.

6. The computerized method of claim 4, further comprising controlling access to the community elements.

7. The computerized method of claim 4, comprising controlling the layout of pages of the assembled elements for display by the client.

8. The computerized method of claim 4, wherein the community elements are selected from the group consisting of: a home page, a membership management tool, a message board, a notification service, non-real timed messages, real-time messages, a chat, a community calendar, a file library, and a picture album.

9. A computing system for scalably managing dynamic communities and for managing annotations, the computing system comprising:
   a tier III server to store data for the annotations;
   a tier II server to maintain an index of the data for the annotations stored on the tier III server, to store community elements, and to process community queries; and
   a tier I server to determine if a content source has annotations indexed by the tier II server an to indicate which communities own the annotations, thereby reducing number of complex queries for said annotations to improve scalability.

10. The computing system of claim 9, wherein the tier I server comprises a plurality of servers.

11. The computing system of claim 9, wherein the tier II server comprises a plurality of servers.

12. The computing system of claim 9, wherein the tier III server comprises a plurality of servers.

13. The computing system of claim 9, wherein the content source is identified by a document identifier.

14. The computing system of claim 13, wherein the document identifier is selected from the group consisting of: a directory path, a uniform resource locator, and a file name.

15. A computer readable medium having computer executable instructions for a scalable method of managing dynamic communities stored thereon, the method comprising:

storing a plurality of community elements in a multiple tier computing system;

receiving a request from a client to access one or more of the community elements from a first tier;

assembling the community elements as a function of the request from a second tier;

dynamically generating one or more pages of the assembled elements for display by the client; and wherein to improve scalability said one or more pages are generated with a reduced number of complex queries for said community elements.

16. The computer readable medium of claim 15, further comprising computer executable instructions for controlling access to the community elements.

17. The computer readable medium of claim 15, further comprising computer executable instructions for authenticating the user requesting the information.

18. The computer readable medium of claim 15, further comprising computer executable instructions for controlling the layout of pages of the assembled elements for display by the client.

19. The computer readable medium of claim 15, wherein the community elements are selected from the group consisting of: a home page, a membership management tool, a message board, a notification service, non-real timed messages, real-time messages, a chat, a community calendar, a file library, and a picture album.

* * * * *

UNITED STATES PATENT AND TRADEMARK OFFICE
CERTIFICATE OF CORRECTION

PATENT NO. : 6,581,096 B1
DATED : June 17, 2003
INVENTOR(S) : S.C. Cottrille et al.

It is certified that error appears in the above-identified patent and that said Letters Patent is hereby corrected as shown below:

Column 2,
Line 38, after "the servers of" insert -- the --

Column 3,
Line 44, "(RAM) 25. a basic" should read -- (RAM) 25. A basic --

Column 5,
Line 26, "is to provides" should read -- is to provide --

Column 9,
Line 57, "computer" should read -- computing --
Line 64, after "wherein" insert -- in --

Column 10,
Line 17, after "one or more" insert -- of --
Line 49, "an to" should read -- and to --
Line 51, after "reducing" insert -- the --

Signed and Sealed this

Seventh Day of September, 2004

JON W. DUDAS
*Director of the United States Patent and Trademark Office*